United States Patent
Cho (10) Patent No.: US 8,485,666 B2
(45) Date of Patent: Jul. 16, 2013

(54) CAR THEATER SYSTEM USING REAR PROJECTION

(75) Inventor: Jun Young Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 442 days.

(21) Appl. No.: 12/840,204

(22) Filed: Jul. 20, 2010

(65) Prior Publication Data

US 2011/0128453 A1     Jun. 2, 2011

(30) Foreign Application Priority Data

Dec. 1, 2009   (KR) ........................ 10-2009-0117996

(51) Int. Cl.
     *G03B 21/00*      (2006.01)

(52) U.S. Cl.
     USPC ............................................ 353/13; 348/837

(58) Field of Classification Search
     None
     See application file for complete search history.

(56) References Cited

U.S. PATENT DOCUMENTS

| | | | |
|---|---|---|---|
| 7,131,728 B2 | 11/2006 | Nambudiri et al. | |
| 7,175,321 B1* | 2/2007 | Lopez | 362/496 |
| 2004/0189947 A1* | 9/2004 | Hattori et al. | 353/13 |
| 2005/0046755 A1* | 3/2005 | Hattori et al. | 348/837 |
| 2005/0122487 A1* | 6/2005 | Koyama et al. | 353/94 |
| 2006/0061457 A1* | 3/2006 | Ferguson | 340/426.34 |

FOREIGN PATENT DOCUMENTS

| | | | |
|---|---|---|---|
| JP | 05-330362 A | | 12/1993 |
| JP | 2005-077823 A | | 3/2005 |
| JP | 2007-186017 A | | 7/2007 |
| JP | 2007186017 A | * | 7/2007 |
| KR | 10-2002-0021091 | | 3/2002 |
| KR | 10-2009-0082259 | | 7/2009 |

* cited by examiner

*Primary Examiner* — Sath V Perungavoor
*Assistant Examiner* — Dakshesh Parikh
(74) *Attorney, Agent, or Firm* — Edward Wildman Palmer LLP; Peter F. Corless (57) ABSTRACT

The present invention features a car theater system using rear projection that extends projection distance through a reflection mirror, and may not restrict movement of passengers, and may not block an image projected toward a screen. According to preferred embodiments, the car theater system of the present invention comprises a video player, a projector, a reflection mirror, a screen for imaging an image reflected by the reflection mirror.

8 Claims, 8 Drawing Sheets

| PROJECTION DISTANCE(cm) | SCREEN SIZE(cm) |
|---|---|
| 20 | 10.6×7.0 |
| 40 | 21.1×14.1 |
| 80 | 42.3×28.2 |
| 150 | 79.3×52.8 |
| 200 | 105.7×70.4 |

CAR THEATER SYSTEM USING REAR PROJECTION

CROSS-REFERENCE TO RELATED APPLICATION

The present application claims under 35 U.S.C. §119(a) to the benefit of Korean Patent Application Number 10-2009-117996, filed on Dec. 1, 2009, the entire contents of which are incorporated herein for all purposes by this reference.

BACKGROUND OF THE INVENTION

1. Field of the invention

The present invention relates, generally, to a car theater system, and more particularly, to a car theater system using a rear projection, in which a screen rear projection technology is applied into the inside of the vehicle.

2. Description of Background Art

Considering elements of a general AV (Audio and Video) system for a vehicle, a video player such as a DVD player, a VTR player, or the like, are preferably used in the vehicle so that sound facilities may be suitably connected with a display apparatus such an LCD TV, or the like, wherein the sound facilities are preferably connected with speakers equipped to each of components of the vehicle. Preferably, in the case of the sound facilities, the sound output may be excellent since the speakers are suitably arranged in all directions when isolated indoors, while the display apparatus is difficult to acquire an exciting screen since it uses a small sized LCD TV. However, there were no adequate alternatives since a large sized LCD TV or other type of display apparatuses may be not used in the narrow space in the inside of the vehicle.

Accordingly, a car theater system equipped in the vehicle was developed.

Figure 1:
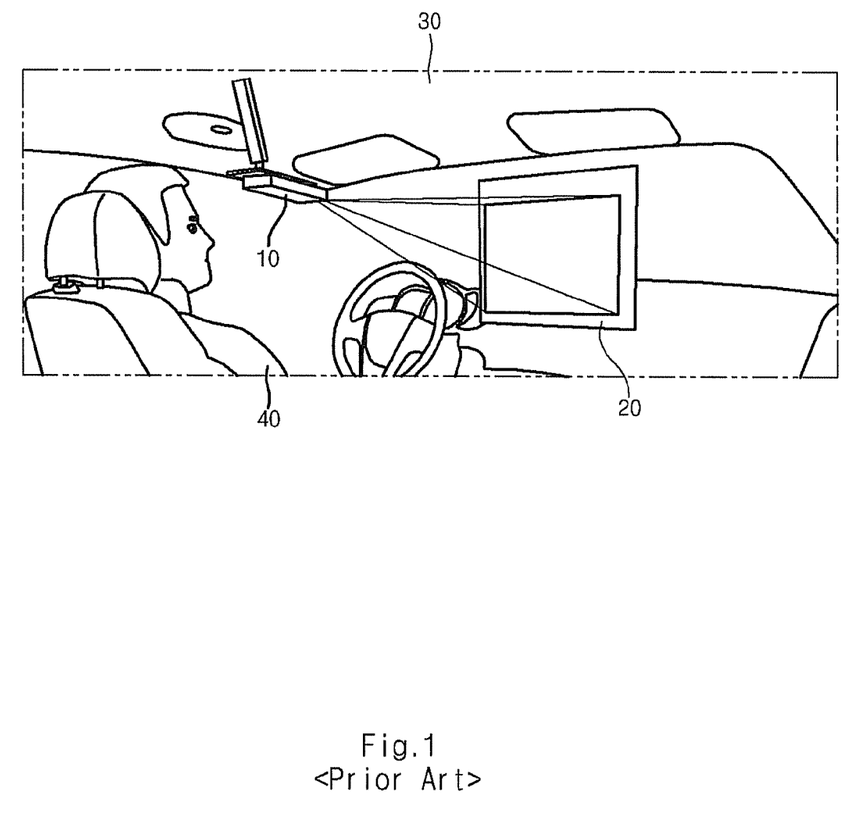
FIG. 1 is an exemplary view for explaining the concept of a car theater system arranged in a vehicle.

FIG. 1 is an exemplary view of a car theater system arranged in a vehicle. Referring to FIG. 1, the car theater system may preferably include a projector 10 and a screen 20 in the vehicle 30, and accordingly, a driver 40 may preferably use a large scaled LCD TV or other types of display apparatuses even in a narrow space of the vehicle.

Korean Patent No. 10-0560225 (Publication date: 21 Feb. 2005), incorporated by reference in its entirety herein, provides "CAR THEATER SYSTEM", which was filed by the present applicant(s), and is explained with reference to FIGS. 2 and 3.

Figure 2:
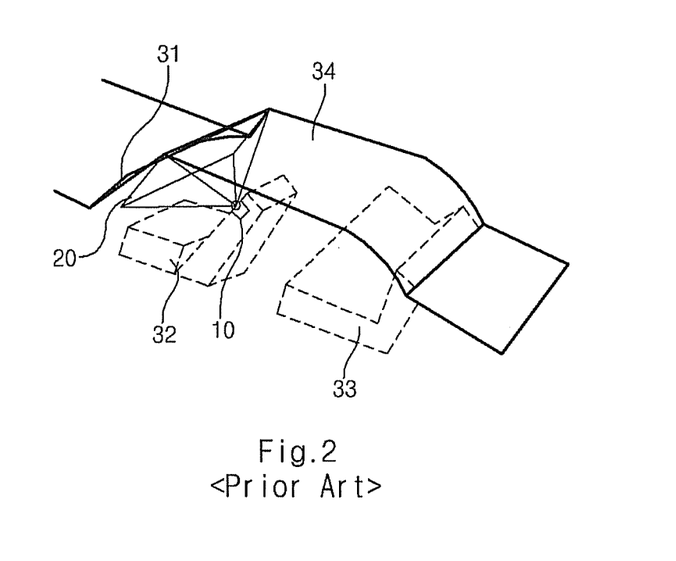
FIG. 2 is an exemplary view for illustrating elements of a car theater system according to the prior art.
Figure 3:
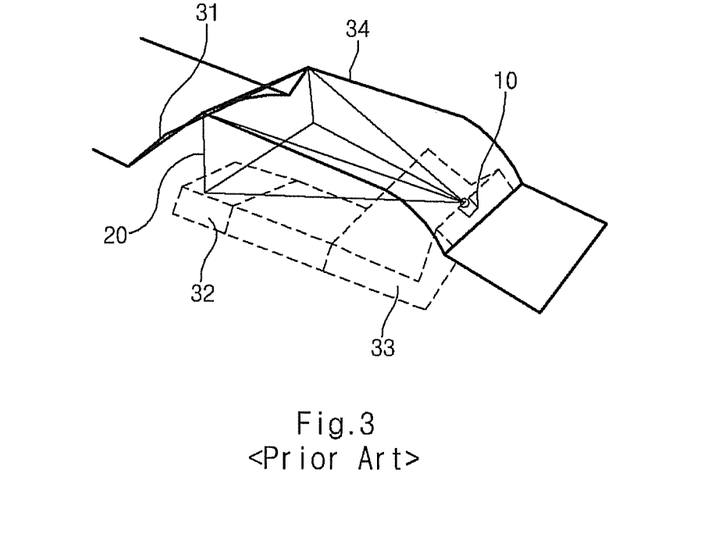
FIG. 3 is an exemplary view for illustrating another structure of a car theater system according to the prior art.

FIG. 2 is a view for illustrating elements of a car theater system according to the prior art, and FIG. 3 is a view for illustrating another structure of a car theater system according to the prior art. In particular, FIG. 2 illustrates an example where a beam projector is suitably arranged onto a front seat, and FIG. 3 illustrates a case where a beam projector is suitably arranged onto a rear seat.

According to certain preferred embodiments, and referring to FIG. 2, for example, the car theater system according to the prior art may preferably include a beam projector 10 for suitably projecting an image, and a roll screen 20 as a screen apparatus for suitably imaging the image projected from the beam projector 10. Preferably, the beam projector 10 is suitably equipped onto a front seat 32.

According to certain preferred embodiments, the beam projector 10 is preferably arranged nearby a center arm rest corresponding to a center position of a vehicle so that it may suitably project a beam in a direction of the windshield glass 31. More specifically, the beam projector 10 is preferably stored in the inside of the center arm rest, and, if necessary, it may be drawn out for use. Otherwise, by preparing a fixing means for fixing the beam projector 10 on the upper side of the center arm rest, if necessary, it may fix the beam projector 10 into the fixing means.

In addition, in order to accommodate the narrow space in the vehicle, the roll screen 20 used as a screen apparatus is ordinarily stored, and, if necessary, may be drawn out, wherein the roll screen 20 is suitably equipped to a rear roof 34 which is just adjacent to the windshield glass 31 and is drawn out in parallel with the windshield glass 31, so that the maximum area to be spread out may be suitably secured in the inner space of the vehicle, and a driver may watch the roll screen 20 in a comfortable position. Accordingly, since a gaze in spreading the roll screen 20 and a gaze in looking to the front side of the vehicle through the windshield glass 31 are in the same direction, a driver or a passenger may appreciate the movie screen in a comfortable position on the seat of the vehicle. However, when arranging the beam projector 10 onto the front seat 32, the projection distance may be short.

Referring to FIG. 3, for example, in order to accommodate the short projection distance, the car theater system according to the prior art may accord a front seat 32 with a rear seat 33 by pushing a chair back of the front seat 32 backward, and then, it may provide an angle for which a viewer may lie down to watch it. Further, in placing the roll screen 20 and the beam projector 10, by pulling the chair back of the front seat 32 forward, it may suitably prevent the chair back of the front seat 32 from obstructing the view when a viewer is seated in the rear seat 33. And accordingly, the viewer may appreciate the movie screen even though the viewer is seated in the rear seat 33.

As shown in FIGS. 2 and 3, the car theater system according to the prior art used rear projection technology, in which the beam projector equipped at the front of the screen may directly project the image toward the front of the screen.

In certain cases of using the technology for the screen rear projection, the movement of the passenger may be restricted by the beam projector or the projected image may be blocked by the beam projector. Further, since a power outlet and a video/audio terminal are suitably arranged at the front of many vehicles, a long power cable and a video/audio wire may be required, and accordingly, it may not be convenient for use.

The above information disclosed in this the Background section is only for enhancement of understanding of the background of the invention and therefore it may contain information that does not form the prior art that is already known in this country to a person of ordinary skill in the art.

BRIEF SUMMARY OF THE INVENTION

In preferred aspects, the present invention provides a car theater system using a rear projection, wherein, by using a rear projection technology, it may suitably extend a projection distance by a reflection mirror.

In preferred embodiments, the present invention provides a car theater system using a rear projection, wherein it may not restrict movement of a driver or a passenger and may not suitably block an image projected towards a screen.

In certain preferred embodiments, the present invention preferably provide a car theater system using a rear projection, wherein, by arranging a suitable connection port at a lower side of a center fascia placed at a front seat of the vehicle by using a rear projection technology, it may suitably decrease a power cable and a video/audio wire which are connected with a projector.

In still further preferred embodiments, the present invention preferably provides a car theater system using a rear projection, wherein, by using a rear projection technology, it may suitably project an image toward a screen which is preferably arranged at the rear side of a vehicle.

In another further preferred embodiment, the present invention features a car theater system using a projector and a reflection mirror, the car theater system comprising a video player suitably arranged in the vehicle in order to play the image; a projector suitably equipped to a crush pad of the vehicle, and electrically connected to the video player through a connection port, in which the projector suitably enlarges the image produced by the video player, and then projects the suitably enlarged image by a rear projection method; a reflection mirror which is suitably arranged in a front side of the projector, for reflecting the image onto a rear side of the vehicle, in which the image is suitably projected toward the front side of the vehicle; and a screen which is suitably equipped in a vehicle roof which is adjacent to a windshield glass, for imaging the image reflected by the reflection mirror.

Preferably, the connection port in the projector may be an AUX/USB connection port which is suitably arranged at the lower side of a center fascia placed at a front seat of the vehicle.

Preferably, the screen is arranged at a front downward side of the vehicle roof in order not to restrict a movement of a driver or a passenger.

In another further embodiment of the present invention, an angle between the projector and the reflection mirror is an angle of 92 degrees.

In still another further embodiment of the present invention, in case where a distance between the projector and the reflection mirror is 180 mm, the reflection mirror with a length of 85 mm is used to suitably secure a projection distance of 810 mm.

Preferably, the screen may have a size of 20 inch on the basis of a diagonal line through the projection distance of 810 mm.

In another further embodiment of the present invention, a car theater system of a rear projection type, in which the car theater system is suitably arranged in the inside of a vehicle in order to display an image through a projector and a screen, the car theater system preferably comprises a video player that is arranged in the vehicle in order to play the image; a projector that is suitably equipped to a crush pad of the vehicle, and electrically connected to the video player through a connection port, in which the projector enlarges the image produced by the video player, and then suitably projects the enlarged image by a rear projection method; and a screen which is suitably equipped in a vertical downward direction and at a front side of a rear glass from a vehicle roof, for imaging the image projected by the projector.

According to certain preferred embodiments, the connection port in the projector is an AUX/USB connection port which is suitably arranged at the lower side of a center fascia placed at a front seat of the vehicle.

According to preferred embodiments of the present invention, it is possible to suitably extend a projection distance by a reflection mirror.

According to other preferred embodiments of the present invention, it is possible not to restrict a movement of a driver or passengers, and not to block an image projected towards the screen.

According to other further preferred embodiments of the present invention, by arranging a connection port at a lower side of a center fascia paced at the front seat, it is possible to suitably decrease a power cable and a video/audio wire which are suitably connected with a projector, and accordingly, improve the convenience for use.

Preferably, according to preferred embodiments of the present invention, by using a rear projection technology, it is possible to suitably project an image onto the screen arranged at the rear side of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

As described herein, the present invention includes a car theater system using a projector and a reflection mirror, the car theater system comprising a video player, a projector, a reflection mirror, and a screen for imaging an image reflected by the reflection mirror.

In one embodiment, the video player is arranged in the vehicle in order to play the image.

In another embodiment, the projector is electrically connected to the video player through a connection port, wherein the projector enlarges the image produced by the video player, and then projects the enlarged image by a rear projection method.

In another further preferred embodiment, the projector is equipped to a crush pad of the vehicle.

In still another preferred embodiment, the reflection mirror is arranged in a front side of the projector, and is used for reflecting the image onto a rear side of the vehicle, and wherein the image is projected toward the front side of the vehicle.

According to yet another further preferred embodiment, the screen is equipped in a vehicle roof which is adjacent to a windshield glass.

In another aspect, the present invention features a car theater system of a rear projection type comprising a video player, a projector, and a screen, for imaging the image projected by the projector.

In one embodiment, the car theater system is arranged in the inside of a vehicle in order to display an image through a projector and a screen.

In another embodiment, the video player is arranged in the vehicle in order to play the image.

In still another preferred embodiment, the projector is electrically connected to the video player through a connection port, wherein the projector enlarges the image produced by the video player, and then projects the enlarged image by a rear projection method.

In another further embodiment, the projector is equipped to a crush pad of the vehicle.

In further preferred embodiments, the screen is equipped in a rear side of a front glass from a vehicle roof, and is used for imaging the projected image.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures. The present invention may be embodied in various embodiments, which are not limited by the embodiments illustrated herein.

Figure 4:
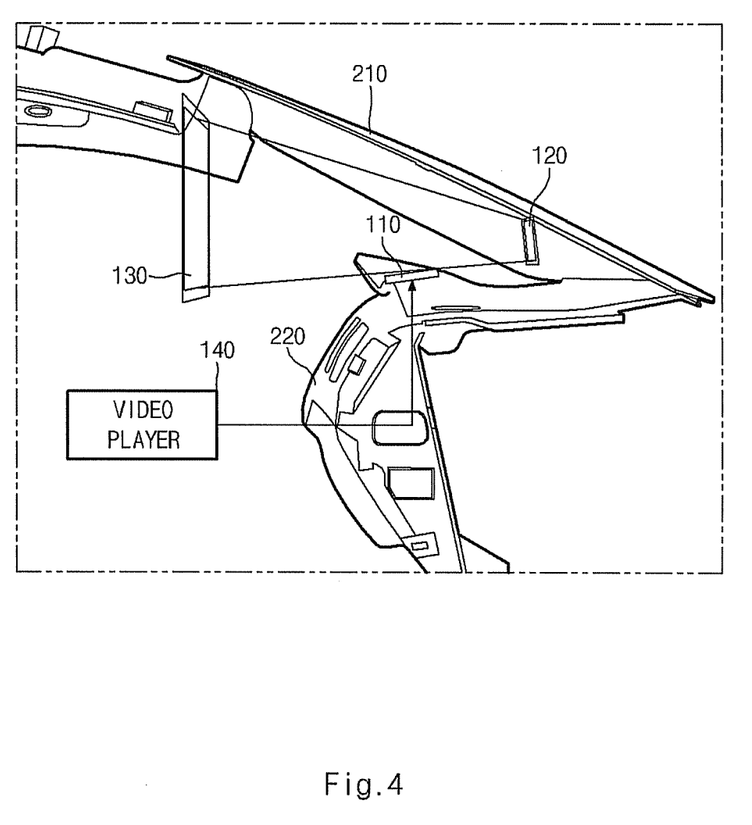
FIG. 4 is an exemplary view for illustrating a car theater system using a projector and a reflection mirror according to an embodiment of the present invention.

According to certain preferred embodiments and as shown in FIG. 4, for example, FIG. 4 is a view for illustrating a car theater system using a projector and a reflection mirror according to an embodiment of the present invention.

Referring to FIG. 4, the car theater system using a projector and a reflection mirror according to an embodiment of the present invention may preferably include a projector 110, a reflection mirror 120, a screen 130 and a video player 140.

According to certain preferred embodiments, the video player 140 is suitably equipped in the vehicle, and it refers to a video player or a DVD player. Preferably, it may include all types of apparatuses for playing an image. Further, the video player 140 may be a player for playing a sound signal as well as an image signal. Preferably, a sound facility, for example, a speaker may be suitably equipped to common positions in the vehicle, wherein the speaker may suitably receive a sound signal outputted from the video player 140 and may output the sound.

Preferably, the projector 110 is suitably equipped to a crush pad (Dash board) 220 of the vehicle, and is electrically connected with the video player 140 through a connection port. According to certain preferred embodiments, it may enlarge the image produced from the video player 140, and may suitably project the enlarged image toward the screen 130 by a rear projection method. Since elements of the projector 110 are commonly known, a detailed explanation of the elements of the projector 110 will be omitted.

According to further preferred embodiments, the reflection mirror 120 which is suitably arranged at the front side of the projector 110 reflects the image onto the rear side of the vehicle, in which the image is suitably projected from the projector 110 toward the front side of the vehicle. And accordingly, the projection distance suitably projected from the projector 110 to the screen 130 may be suitably extended by the reflection mirror 120.

Preferably, the screen 130 that is suitably equipped in a vehicle roof 210 adjacent to a windshield glass, may suitably image the image projected from the projector 110 and reflected by the reflection mirror 120. Here, although the vehicle is illustrated on the basis of a private car, it may, for example, be an RV (Recreation Vehicle) or a van, although is not limited to said examples. Preferably, in certain exemplary embodiments, the screen 130 may be suitably arranged at the front downward side of a vehicle roof 210 in order not to restrict the movement of passengers.

Accordingly, the car theater system using a projector and a reflection mirror according to an embodiment of the present invention may suitably extend the projection distance through the reflection mirror by using the rear projection technology, may not suitably restrict the movement of the driver or passengers, and may not suitably block the image projected toward the screen.

Figure 5:
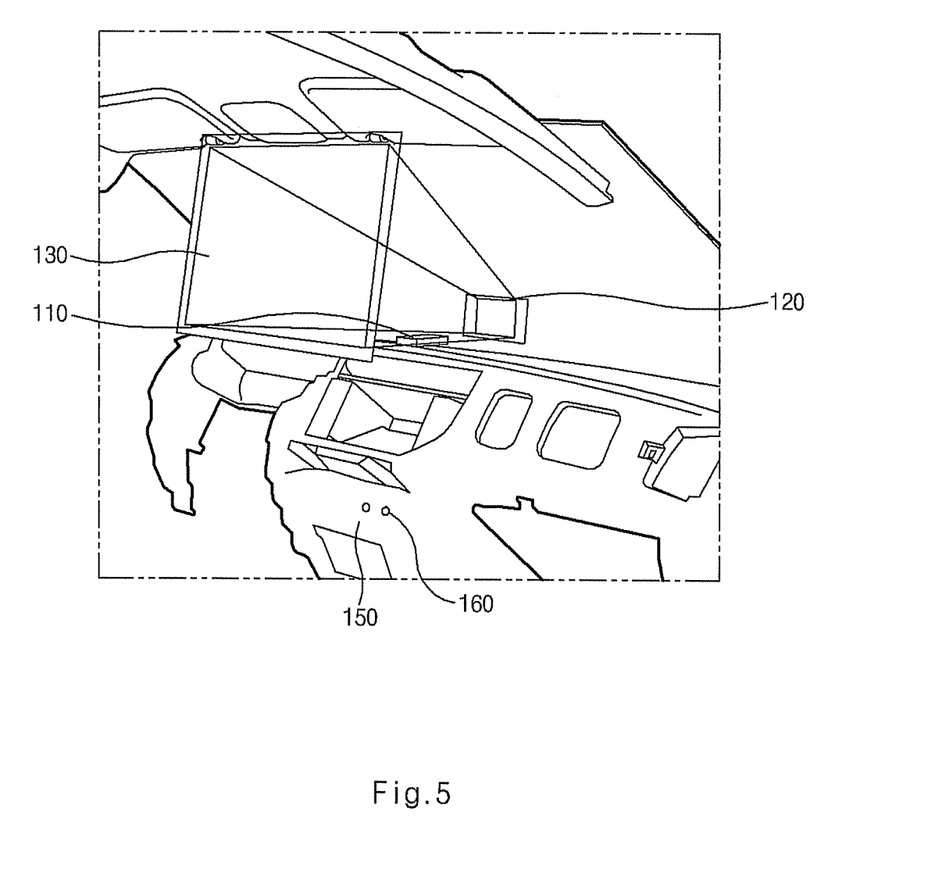
FIG. 5 is an exemplary view for illustrating the connection of ports in a car theater system using a projector and a reflection mirror according to an embodiment of the present invention.

According to certain preferred embodiments of the present invention and as shown in FIG. 5, FIG. 5 is a view for illustrating the connection of ports in a car theater system using a projector and a reflection mirror according to a preferred embodiment of the present invention.

According to certain preferred embodiments, and as shown in FIG. 5, for example, the car theater system using a projector and a reflection mirror according to an embodiment of the present invention may suitably apply an AUX/USB connection port 160 into a lower side of a center fascia 150. Here, preferably, the center fascia refers to a control panel board between a driver's seat and a passenger's seat, which is in the center of the dash board, wherein it is a part in which the dash board and a shift lever meet vertically, and wherein, an audio system, an air conditioner, a controller of a heater, a navigation system, a ventilator, a cigar jack, an ashtray, a cup holder, and the like, are suitably arranged on the center fascia. Further, the center fascia as well as a center console may also preferably serve as the wall which suitably discriminates the driver's seat from the passenger's seat.

Accordingly, in the car theater system using a projector and a reflection mirror according to an embodiment of the present invention, the AUX/USB connection port 160 is suitably arranged to the lower side of the center fascia 150, and accordingly, it is possible to decrease the power cable and the video/audio wire connected with the projector 110 in order to suitably improve the convenience of use.

Figure 6:
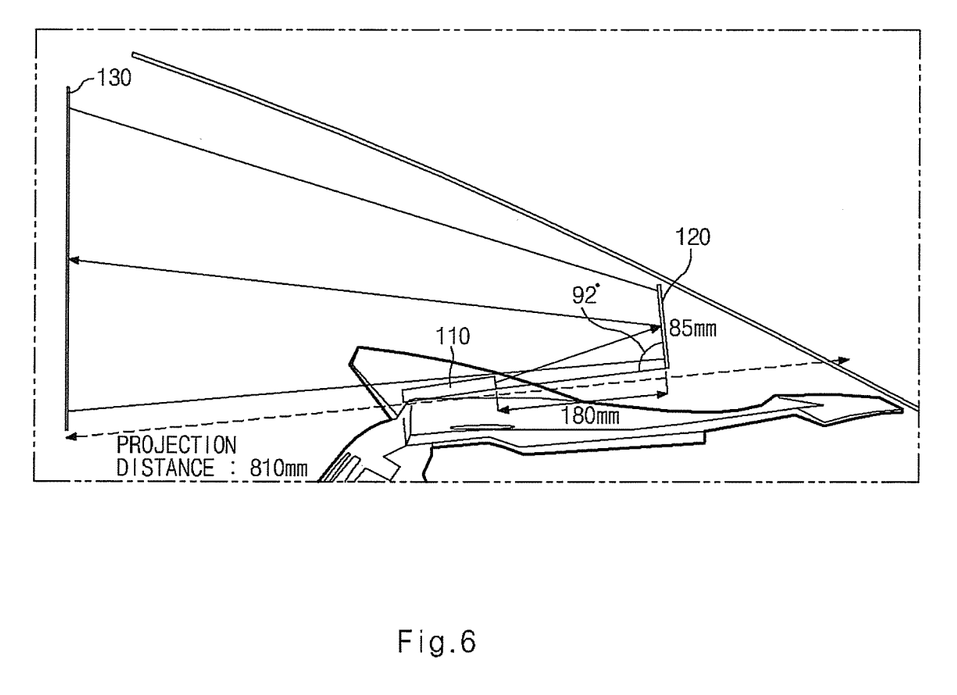
FIG. 6 is an exemplary view for illustrating the principle which a projection distance is extended in a car theater system using a projector and a reflection mirror according to an embodiment of the present invention.

In other further preferred embodiments of the present invention, for example as shown in FIG. 6, FIG. 6 is a view for illustrating the principle in which a projection distance is extended in a car theater system using a projector and a reflection mirror.

Referring to FIG. 6, for example, the car theater system using a projector and a reflection mirror according to an embodiment of the present invention may adequately secure the projection distance of the projector 110 by using the reflection mirror 120.

For example, according to certain exemplary embodiments, in an example where a distance between the projector 110 and the reflection mirror 120 is 180 mm in the inside of the vehicle in which a space is defined, it may suitably secure a projection distance of about 810 mm by placing the reflection mirror 120 with a length of about 85 mm onto the front side of the projector 110, and accordingly, the projection distance may be suitably extended still more than a case of placing the projector 110 onto the rear seat in the vehicle. Accordingly, although an angle between the projector 110 and the reflection mirror 120 may be suitably altered according to positions of the projector 110 and the reflection mirror 120 and the screen 130, it may be preferably an angle of 92 degrees. In addition, the angle may vary according to the distance between the projector 110 and the reflection mirror 120, a type of vehicle, or the like.

In another further preferred embodiment of the present invention, by applying the screen rear projection technology into the corresponding vehicle, a car theater system may be easily embodied. Further, the problem that the projection distance decreases in case of arranging the projector 110 to a crush pad according to the prior art, may be overcome by using the reflection mirror 120. Further, since the car theater system of the prior art may be used as it is, it is possible to easily utilize the power outlet and the video/audio terminal.

Figure 7:
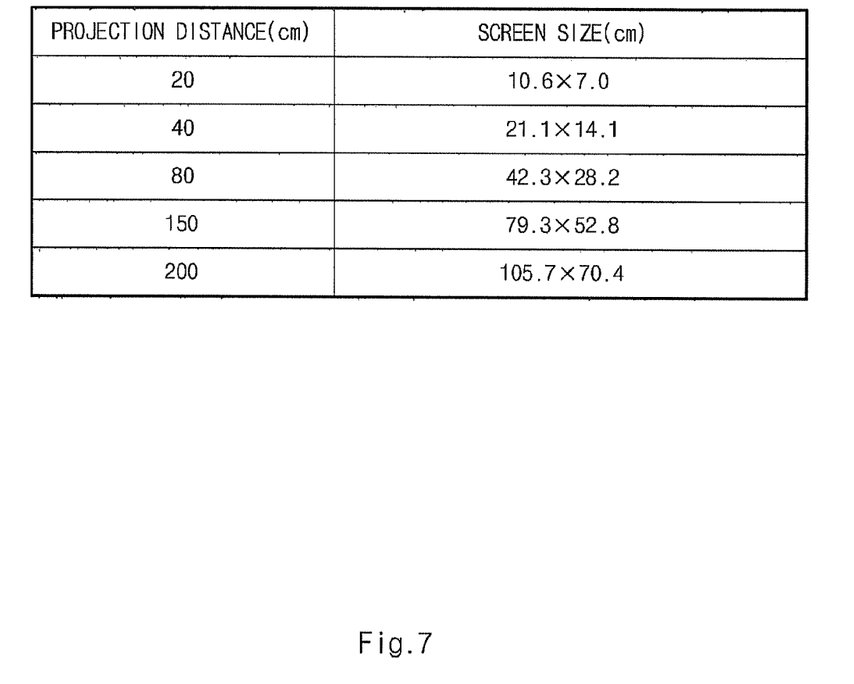
FIG. 7 is a table for illustrating a relation of a projection distance and a screen size in a car theater system using a projector and a reflection mirror according to an exemplary embodiment of the present invention.
Figure 8:
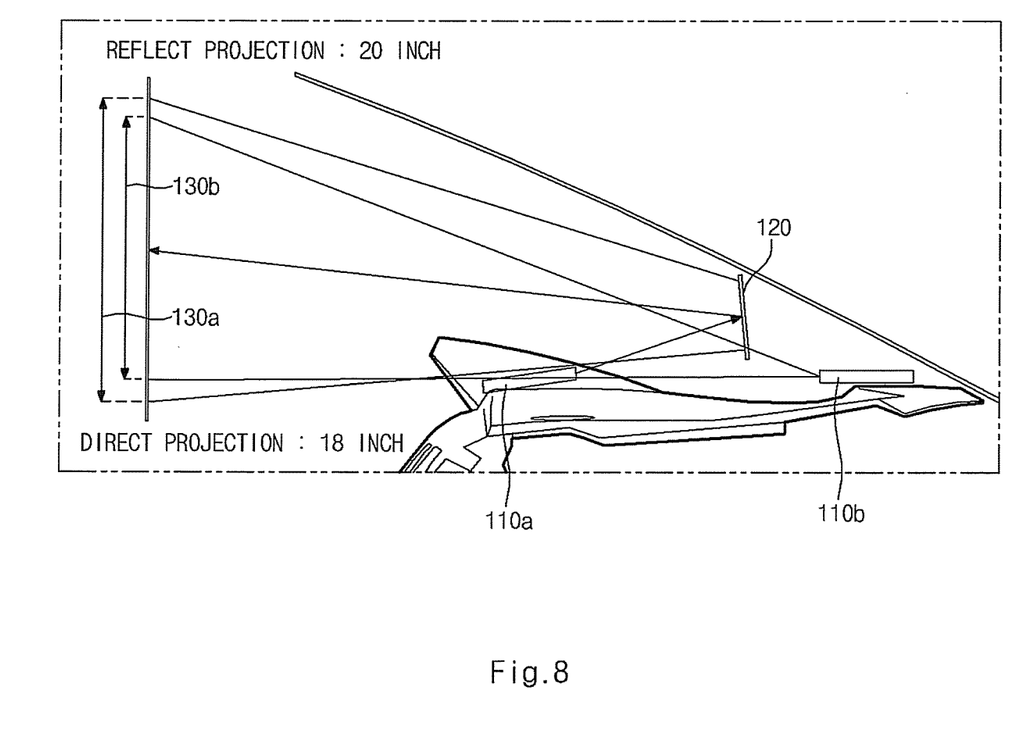
FIG. 8 is a view for comparing a car theater system according to the prior art with a car theater system using a projector and a reflection mirror according to an exemplary embodiment of the present invention.

According to other further preferred embodiments of the present invention, and as shown in FIG. 8, for example, FIG. 7 is a table for illustrating a relation of a projection distance and a screen size in a car theater system using a projector and a reflection mirror according to an exemplary embodiment of the present invention.

In preferred embodiments of the present invention, if the projection distance corresponding to a distance between the projector 110 and the screen 130 becomes far away, a size of the screen 130 becomes large and the image may become not clear. According to certain preferred embodiments, a relation of the projection distance and the size of the screen may be suitably determined as shown in FIG. 7. That is, the projection distance must be suitably extended in order to enlarge the size of the screen 130, but the projection distance may be not suitably extended by a direct projection method since the inner space is suitably defined in the vehicle, and accordingly, preferred embodiments of the present invention may suitably extend the projection distance by using the reflection mirror 120.

According to certain preferred embodiments and as shown in FIG. 8, for example, FIG. 8 is a view for comparing a car theater system according to the prior art with a car theater system using a projector and a reflection mirror according to a preferred embodiment of the present invention.

Referring to FIG. 8, for example, in case of the car theater system of the prior art, since a projector 110b directly projects an image onto a screen 130b by suitably arranging the projector 110b at the crush pad, a size of the screen 130b may preferably be 18 inches on the basis of a diagonal line. In further preferred embodiments, in the case of the car theater system using a projector and a reflection mirror according to an exemplary embodiment of the present invention, since a projector 110a projects an image onto a screen 130a through a reflection mirror 120 by arranging the projector 110a at the crush pad, a size of the screen 130b may preferably be 20 inches on the basis of a diagonal line. That is, the car theater system according to a preferred exemplary embodiment of the present invention may easily overcome a problem that the size of the screen must be decreased since the projection distance is short in case of the direct projection method of the prior art, and another problem that a user has difficulties dealing with a projector.

Accordingly, the car theater system using a projector and a reflection mirror according to another preferred embodiment of the present invention may suitably extend the projection distance by the reflection mirror by using the rear projection technology, may not restrict the movement of passengers, and may not block the image which is projected onto the screen.

Figure 9:
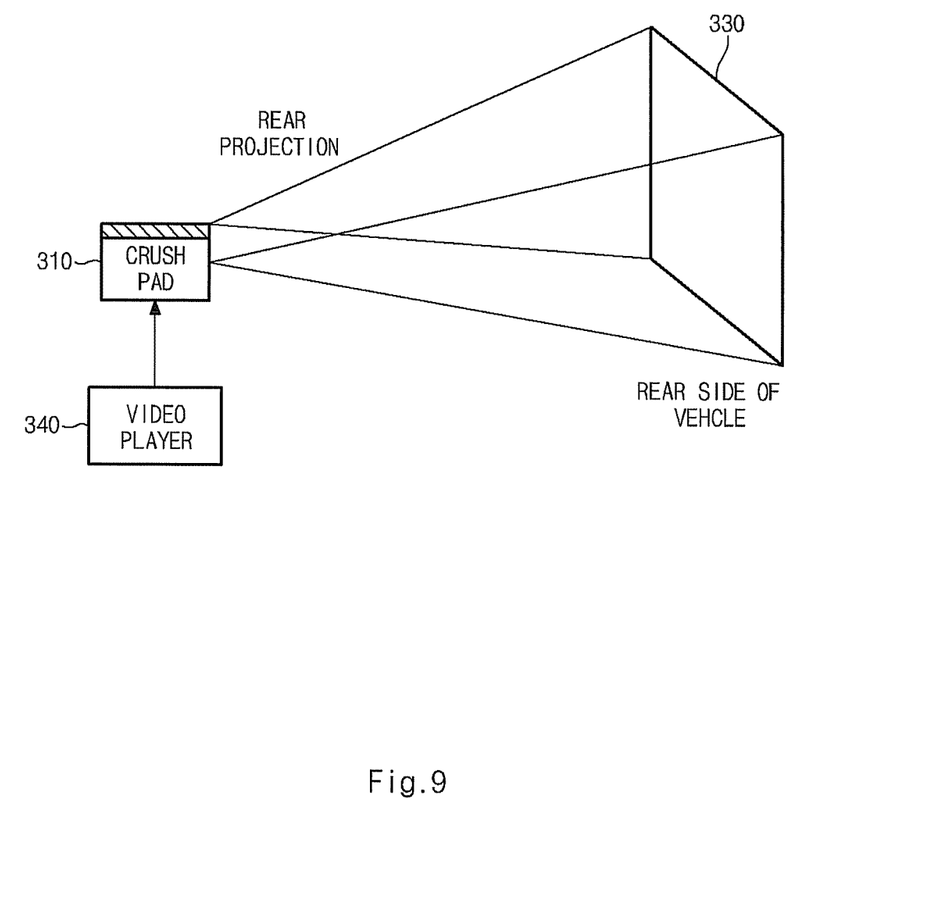
FIG. 9 is a view for illustrating a car theater system of a rear projection type according to another exemplary embodiment of the present invention.

According to still other exemplary embodiments, and as shown in FIG. 9, FIG. 9 is a view for illustrating a car theater system of a rear projection type according to another embodiment of the present invention.

Referring to FIG. 9, for example, the car theater system of a rear projection type according to another embodiment of the present invention may preferably include a projector 310, a screen 330 and a video player 340.

Preferably, the video player 340 is suitably equipped in the vehicle, and it refers to a video player or a DVD player. Preferably, it may include all types of apparatuses for playing an image.

Preferably, the projector 310 is suitably equipped to a crush pad of the vehicle, and is electrically connected with the video player 340 through a connection port. And accordingly, it may enlarge the image produced from the video player 340, and may project the enlarged image toward the screen 330 by a rear projection method. Since elements of the projector 310 are commonly known, a detailed explanation of the elements of the projector 310 are omitted.

According to still further preferred embodiments of the present invention, the screen 330 equipped in a vehicle roof and at the rear side of a front window, may image the image projected from the projector 310. Here, although the vehicle is illustrated on the basis of a private car, it may also be an RV (Recreation vehicle) or a van, although is not limited to said vehicles.

Accordingly, the car theater system of a rear projection type according to another embodiment of the present invention may suitably image the image onto the screen which is suitably arranged at the rear side of the vehicle by using the rear projection technology without the above-described reflection mirror.

The foregoing description of the present invention is intended to be illustrative, and those of ordinary skill in the art will understand that the present invention may be changed into other specific forms without modifying technical conceptions or essential characteristics according to the present invention. Therefore, it must be understood that the above-described embodiment is to be illustrative not to be definitive.

The present invention is intended to fall within the scope of the following appended claims not within the scope of the detailed description, and accordingly, it must be understood that the meaning and scope of the appended claims and all such changes, modifications and variations induced by the equivalents are included in the scope of the present invention.

What is claimed is:

1. A car theater system using a projector and a reflection mirror, the car theater system comprising:
   a video player arranged in the vehicle in order to play the image;
   a projector equipped on a crush pad of the vehicle, and electrically connected to the video player through a connection port, in which the projector enlarges the image produced by the video player, and then projects the enlarged image by a rear projection method;
   a reflection mirror which is arranged above the crush pad of the vehicle in a front side of the projector, for reflecting the image onto a rear side of the vehicle, in which the image is projected toward the front side of the vehicle; and
   a screen which is equipped in a vehicle roof which is adjacent to a windshield glass, for imaging the image reflected by the reflection mirror.

2. The car theater system of claim 1, wherein the connection port in the projector is an AUX/USB connection port which is arranged at the lower side of a center fascia placed at a front seat of the vehicle.

3. The car theater system of claim 1, wherein the screen is arranged at a front downward side of the vehicle roof in order not to restrict a movement of a driver or a passenger.

4. The car theater system of claim 3, wherein an angle between the projector and the reflection mirror is an angle of 92 degrees.

5. The car theater system of claim 1, wherein a distance between the projector and the reflection mirror is 180 mm, and a reflection mirror with a length of 85 mm is used to secure a projection distance of 810 mm.

6. The car theater system of claim 5, wherein the screen has a size of 20 inches on the basis of a diagonal line through the projection distance of 810 mm.

7. A car theater system of a rear projection type, in which the car theater system is arranged in the inside of a vehicle in order to display an image through a projector and a screen, the car theater system comprising:
   a video player arranged in the vehicle in order to play the image;
   a projector equipped on a crush pad of the vehicle, and electrically connected to the video player through a connection port, in which the projector enlarges the image produced by the video player, and then projects the enlarged image by a rear projection method; and
   a screen which is equipped in a rear side of a front glass from a vehicle roof, for imaging the image projected by the projector.

8. The car theater system of a rear projection type of claim 7, wherein the connection port in the projector is an AUX/USB connection port which is arranged at the lower side of a center fascia placed at a front seat of the vehicle.

* * * * *